Figure 1:
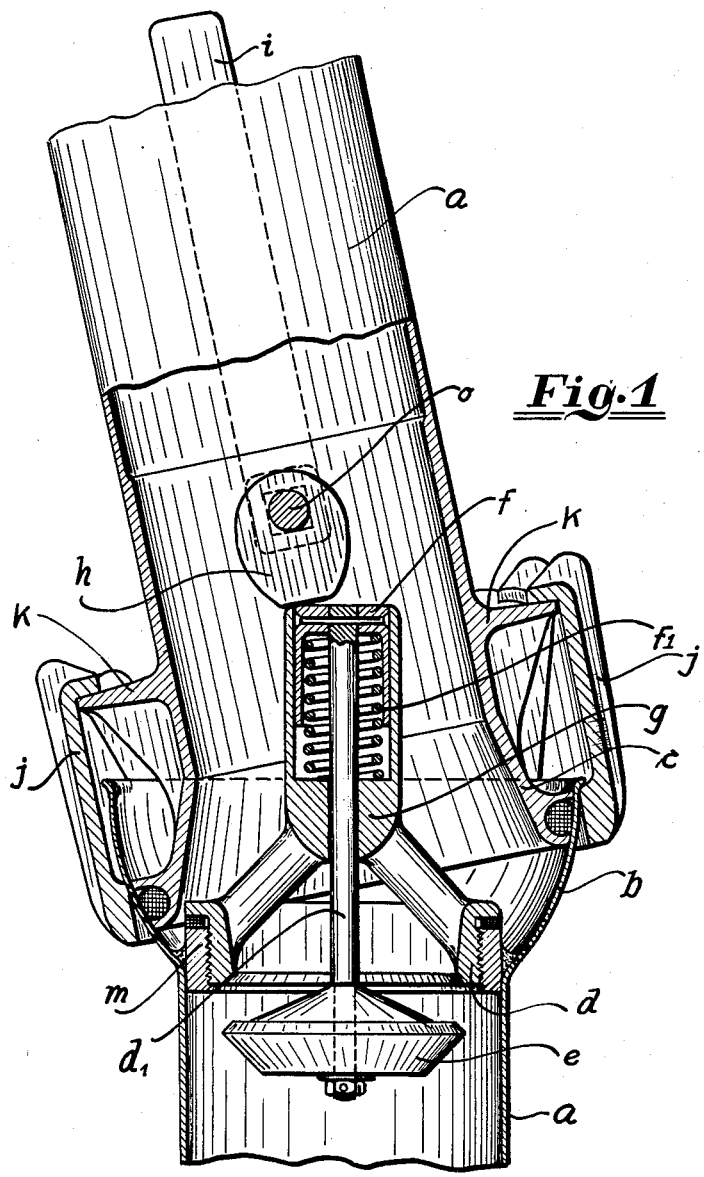

Aug. 17, 1954     K. L. LANNINGER     2,686,529
MOVABLE PIPE LINE

Filed April 5, 1950     3 Sheets-Sheet 1

INVENTOR.
KARL L. LANNINGER

Aug. 17, 1954 K. L. LANNINGER 2,686,529
MOVABLE PIPE LINE
Filed April 5, 1950 3 Sheets-Sheet 2
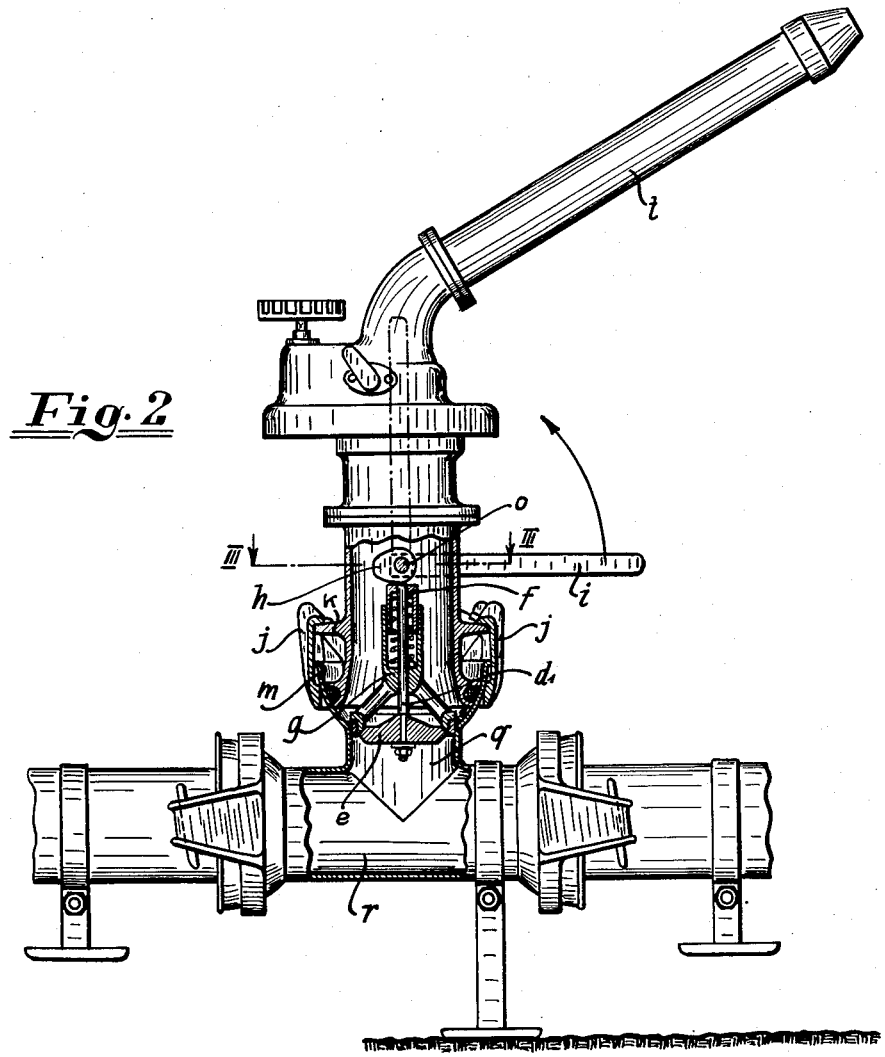
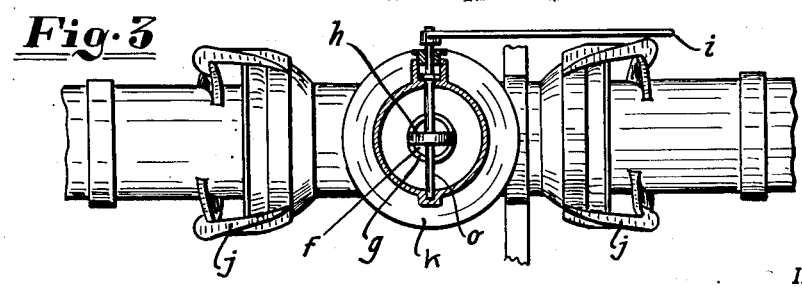
INVENTOR.
KARL L. LANNINGER
BY Aug. 17, 1954  K. L. LANNINGER  2,686,529
MOVABLE PIPE LINE Filed April 5, 1950  3 Sheets-Sheet 3

INVENTOR.
KARL L. LANNINGER
BY

Patented Aug. 17, 1954

2,686,529

UNITED STATES PATENT OFFICE 2,686,529

MOVABLE PIPE LINE

Karl Ludwig Lanninger, Frankfurt am Main, Germany

Application April 5, 1950, Serial No. 154,033

3 Claims. (Cl. 137—322)

The invention refers to movable pipe-lines for a fluid or gaseous medium under pressure, especially for irrigation plants, which must be frequently shifted, as a whole or only in parts and whereby the medium to be dispensed has to be conducted from frequently changing sources of supply. In order to avoid a disconnecting of the supplying pump or the main pipe-line in each case of change of the position of the pipe-line or of the sources of supply to be used, it is known to arrange throttling slides or valves especially at the branches or sources of supply. The slide and spindle valves used for this purpose up to the present time require, however, a comparatively long time for opening and closing and their operation often requires a considerable physical effort. Furthermore it happens that on account of the long valve strokes the closing is only effected insufficiently, so that considerable losses of water may occur.

Considering the frequent changing of the position of the pipe-lines or of the sources of supply a tedious operation of the valve means a considerable loss of time, without mentioning that in cases of disturbances in one of the branch-lines to be supplied an instantaneous turning off in order to avoid losses of water, which could then lead to the failure of the other points of supply, is a compelling necessity.

The invention concerns a new development of these movable pipe-lines regarding the construction of the valves, which allows an instantaneous turning on or off of single branch-lines, groups of branch-lines or sources of supply, assuring at the same time a leakproof closure of the valve is easily operated. According to the invention in movable pipe-lines of the mentioned kind with inserted throttling-valves these valves are formed as disc-valves, whereby the valve-discs are held in closing-position by springs urging in the streaming direction of the medium to be conducted and controlling-levers, which extend out of the pipe wall, are coordinated to the disc tappets. Suitable cams coordinated to the tappets are used for the control of the valve-discs, which are arranged on bars crosswise fixed in the pipe wall.

Advantageously the disc-valves are arranged at the end of one tube member, perhaps at the outlets of the branch pieces, while the tappet control means is arranged in the entrance of the connecting tube members.

The construction as spring weighted disc-valves, which are opening against the streaming direction, assures an absolutely tight and safe closure of the valve. Thereby the valves are easily put in open- or closed-position by means of the tappet control member. The arrangement of the valves at the ends of single members makes them easily accessible and quickly adjustable or interchangeable as the case may be.

Figure 4:
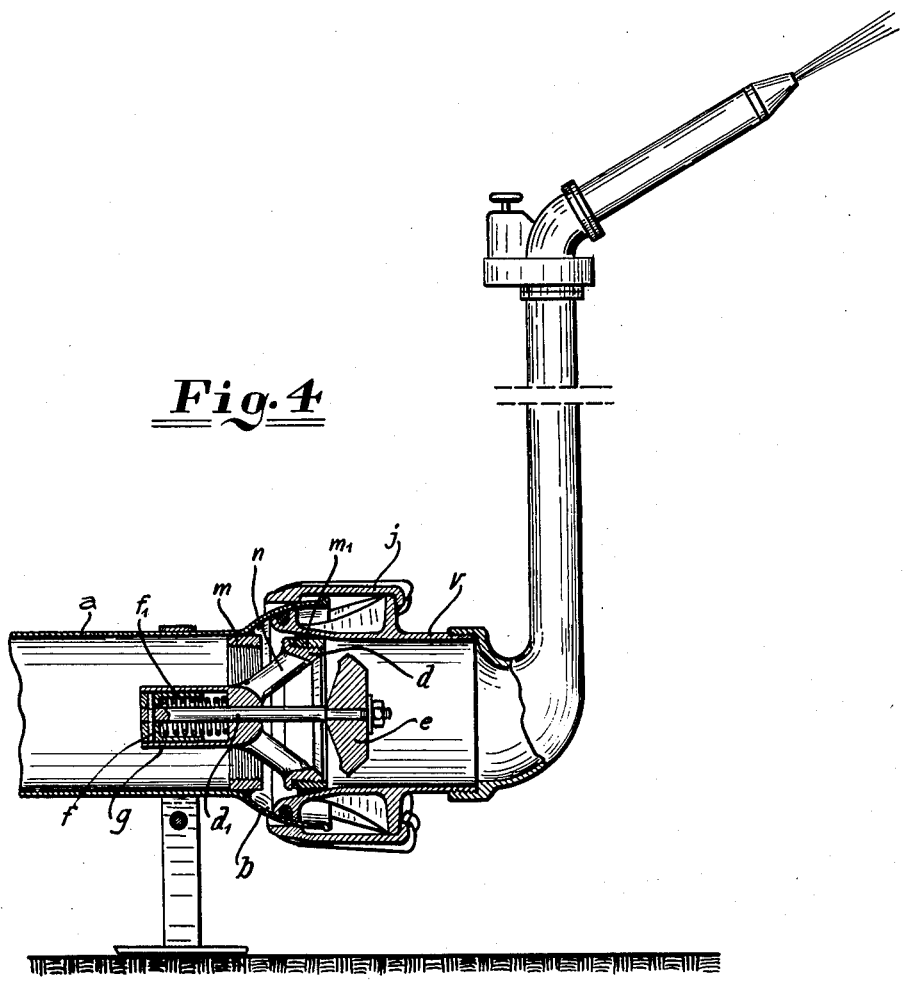

The new structure is described in detail hereinafter and illustrated by means of the drawing. It shows in Fig. 1, two connected pipe sections in angular relation;

Fig. 2, a side elevation, partly broken away, of a T-pipe connected to three straight pipe sections;

Fig. 3, a section on line 3—3 of Fig. 2;

Fig. 4, a modification as regards the location of the valve seat.

The connection of the individual parts of an irrigation plant is performed in the well known way by pipe couplings adapted for being joined quickly at different angles, whereby the tube members $a$ are provided on one end with a spherical bell $b$ and on the other end with a widened portion $c$. The connection of parts $b$ and $c$ is secured by cramps $j$ bridging same, tension levers or the like, which allow any angular position of the next tube member Figs. 1, 2 and 3.

In the shoulder of the spherical bell $b$ a ring with thread $m$ is welded in, which receives a ring formed as valve seat $d$. Ring $d$ carries on arms $n$ a bush of the guide $g$ for rod $d_1$ of a valve disc $e$. At the end of rod $d_1$ a cap $f$ is fixed, which encloses a compression spring $f_1$ for the valve disc and is guided in bush $g$. By spring $f_1$ the valve is kept in closed position, whereby the water pressure acting on the valve disc additionally secures the closed position. The pipe end to be connected takes up a crossbar $o$, which extends out of the pipe wall. Crossbar $o$ carries a cam and is capable of being turned by a hand lever $i$. The position of crossbar $o$ is chosen in such a way that in connected pipes cam $h$ lies opposite cap $f$ of rod $d_1$ and operates the cap $f$ of rod $d_1$ when crossbar $o$ is turned in the sense of the opening motion of the valve.

Thus, as long as a pipe member provided with valve $d$, $e$ forms the end of the pipe line this pipe line is absolutely closed, yet after connection of a further pipe line, where the first tube member is provided with control means $h$, $i$ the valve can be easily and instantaneously opened.

Through adequate distribution of these new instantaneously closing valves any branch lines or sources of supply can thus be connected or disconnected from a main line in different succession. It is likewise possible after closing the respective valves to disconnect the branch lines which are controlled by them and to connect them again at another point. An irrigation plant provided with these valves can consequently be operated without interruption of work and allows at the same time the moving of branch lines and sprinklers without interruption of work.

On account of the comparatively broad spring cap $f$ at the end of the rod the operation of the valve through control means $h$, $i$ is assured even then, when the pipe taking up the control means is connected in an angular position to the tube containing the valve (Fig. 1). Here the tube member to be connected is held by means of cramps $j$ engaging a flange $k$ and screwed to a ring slidably seated on the outer surface of the spherical bellend $b$ of the connecting tube member.

The new valve can also be used as over pressure valve or for the absorption of water impacts when arranged in opposite direction within the pipe line. For this reversibility the pipe end to be connected $v$ is provided with a ring with thread $m_1$ according to Fig. 4, into which the valve unit $d-g$ is to be screwed in. Spring $f_1$ then keeps the disc $e$ in opposition to the water pressure in closed position and opens the outlet under excess pressure only. The tension of spring $f_1$ may be suitably regulated. Advantageously a sprinkler is then connected to the end pipe $v$.

I claim:

1. A movable pipe line for a fluid under pressure, comprising, a pipe section having an enlarged end with an interior and exterior spherical surface and having adjacent its end a valve including a fixed seat, a valve member for occupying the seat and movable therefrom, spring means urging the valve member to seating position, a second pipe section having a conical end fitting into the interior spherical surface of the first section in a plurality of angular positions each characterized by the angle included between the section axes, flanges carried by the second section and operable means carried by the second section for unseating the valve member in any one of the plurality of positions and when in operating position, opening the valve when the ends of the sections are in interfitting relation, the operable means including a cam moving the valve member and a crossbar rotatably mounted across the second section and rigid with the cam and a ring engageable on the exterior spherical surface of the first pipe section in a plurality of angular positions with respect to the axis thereof and carrying hooked members each engageable over one of the flanges to hold the pipe sections together.

2. The movable pipe line according to claim 1 and wherein the valve member is of the disc type and the spring means urges the valve member to its seat in the direction of the flow of fluid.

3. The movable pipe line according to claim 1 and wherein the fixed seat of the valve is exteriorly threaded and the first pipe section carries inwardly an interiorly threaded ring for theaded engagement with the exteriorly threaded valve seat, and the second pipe section also carries inwardly an interiorly threaded ring for selective threaded engagement with the exteriorly threaded valve seat unscrewed from the interiorly threaded ring of the first pipe section.

References Cited in the file of this patent

UNITED STATES PATENTS

| Number | Name | Date |
|---|---|---|
| 1,638,020 | Tibble | Aug. 9, 1927 |
| 2,005,556 | Parker | June 18, 1935 |
| 2,033,880 | Coles | Mar. 10, 1936 |
| 2,034,933 | Wilson | Mar. 24, 1936 |
| 2,199,588 | Cobham | May 7, 1940 |
| 2,225,759 | Strout | Dec. 24, 1940 |
| 2,582,609 | Steele | Jan. 15, 1952 |